United States Patent [19]
Takano et al.

[11] Patent Number: 5,890,076
[45] Date of Patent: Mar. 30, 1999

[54] BASE STATION ARRANGING APPARATUS FOR DESIGNING AN ARRANGEMENT OF RADIO BASE STATIONS, METHOD THEREOF, AND STORING MEDIUM FOR STORING A PROGRAM FOR DETERMINING AN ALTERNATIVE POINT OF A BASE STATION

[75] Inventors: Koji Takano, Hino; Takahisa Hayashi, Ome, both of Japan

[73] Assignee: Kabushiki Kaisha Toshiba, Japan

[21] Appl. No.: 743,877

[22] Filed: Nov. 6, 1996

[30] Foreign Application Priority Data

Nov. 8, 1995 [JP] Japan .................................. 7-289900

[51] Int. Cl.[6] .................................................. H04B 17/00
[52] U.S. Cl. .......................... 455/561; 455/67.1; 455/67.6
[58] Field of Search ...................... 455/507, 577, 455/524, 525, 67.1, 67.3, 67.6, 67.7, 277.1, 277.2, 422, 423, 424, 425, 446, 456, 457, 458, 561; 364/514 B, 514 R, 550, 578; 395/500, 183.01, 183.08, 183.09

[56] References Cited

U.S. PATENT DOCUMENTS

| | | | |
|---|---|---|---|
| 5,491,644 | 2/1996 | Pickering et al. | 455/67.6 |
| 5,574,466 | 11/1996 | Reed et al. | 455/277.2 |
| 5,689,812 | 11/1997 | Takahashi | 455/67.6 |
| 5,710,758 | 1/1998 | Soliman et al. | 455/67.6 |

*Primary Examiner*—Thanh Cong Le
*Attorney, Agent, or Firm*—Finnegan, Henderson, Farabow, Garrett & Dunner, L.L.P.

[57] ABSTRACT

A base station arranging apparatus has a memory 53, a controlling portion 54, and a database 55. The controlling portion 54 forms a virtual space for simulating an area in the memory 53, maps matrix points at which a mobile station and a base station can be arranged to the virtual space in a matrix shape, assigns shape data and building data in the area to the virtual space, generates line-of-sight information between any two matrix points in the virtual space, stores the line-of-sight information in a matrix table 40 of the database 55, calculates the difference between the total numbers of line-of-sight information of each matrix point in the column direction and row direction of the matrix table 40, and successively arranges base stations corresponding to the calculated results.

14 Claims, 12 Drawing Sheets

FIG. 7

FIG. 13 of a memory of the base station arranging apparatus;
BASE STATION ARRANGING APPARATUS FOR DESIGNING AN ARRANGEMENT OF RADIO BASE STATIONS, METHOD THEREOF, AND STORING MEDIUM FOR STORING A PROGRAM FOR DETERMINING AN ALTERNATIVE POINT OF A BASE STATION

BACKGROUND OF THE INVENTION

1. Field of the Invention

The present invention relates to a base station arranging apparatus for arranging base stations that perform radio communications in a particular area such as a company area, a method thereof, and a storing medium for storing a program for determining an alternative point of a base station.

2. Description of the Related Art

When radio communications are made by a plurality of mobile stations through base stations arranged in a predetermined area such as a company area, it is preferred to effectively arrange the base stations in a range of which the mobile stations move.

When radio communication engineer designs an arrangement of base stations as transmitting/receiving sources of radio waves in the area, he or she selects positions at which the base stations will be arranged corresponding to the output of the radio waves of the base stations and the locations of buildings in the area based on his/her experience and intuition. Thereafter, the engineer inputs the selected positions to a predetermined designing system.

Next, the engineer actually goes to the sites of the base stations where he input to the designing system, and he measures and observes the radio environments at sites of the base stations, evaluates optimum positions of the base stations, and marks the evaluated positions on maps or the like. Thereafter, the engineer inputs the evaluated positions to the designing system so as to determine the final positions of the base stations.

In this method, the designing efficiency for arranging the base stations is very low. When there is a building that will be constructed or that is under construction, after it is completed, the radio environments should be measured again. Thus, this method is not effective.

In the conventional method, the engineer should measure and select the positions at which base stations will be arranged at sites. So if the engineer does not have enough experience, it is difficult to design the arrangement of the radio base stations.

If there is a building that will be constructed or that is under construction, since the radio environments vary after and before the completion of the construction, unless the building is completed, the positions of the base stations cannot be determined, thereby deteriorating the designing efficiency.

SUMMARY OF THE INVENTION

The present invention is made from the above-described point of view.

An object of the present invention is to effectively arrange base stations without necessity of the experience of the radio communication engineer.

Another object of the present invention is to effectively arrange base stations corresponding to radio environment of a completed building even if the building has not been completely constructed or that is under design.

To accomplish the above-described objects, a first aspect of the present invention is a base station arranging apparatus, comprising an alternative point assigning means for assigning alternative points of a mobile station and a base station in a space formed of shape data and obstacle data and a base station arrangement position determining means for determining an alternative point that can communicate with the maximum number of alternative points in the alternative points assigned in the space by the alternative point assigning means as an arrangement point of the base station.

A second aspect of the present invention is a storing medium for storing a program that causes a computer to determine the arrangement point of a base station that performs radio communication, wherein the program causes the computer to form an area in which a mobile station or a base station can be arranged corresponding to shape data in a predetermined space and obstacle data, assign a plurality of positions in which a mobile station or a base station can be arranged in the area as alternative points, determine whether or not radio communication can be made between any two points of the plurality of alternative points being assigned, calculate the total number of alternative points on each of the transmitter side and receiver side that can be communicated as the determined result, select an alternative point on the receiver side that can communicate with the minimum number of alternative points on the transmitter side from the alternative points on the receiver side, select an alternative point on the transmitter side that can communicate with the maximum number of alternative points on the receiver side from the plurality of alternative points on the transmitter side that can communicate with the selected alternative point on the receiver side, and determine the selected alternative point as the arrangement point of a base station.

According to the present invention, alternative points are arranged at positions that mobile stations or base stations can exit and the radio communication area is narrowed with the alternative points as transmitter side or receiver side and thereby optimum positions at which the base stations are arranged are determined. Thus, the base stations can be effectively arranged corresponding to the radio environment of a building even if it has not been completely constructed or is under construction.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 7 is a schematic diagram in the case that a transmitter number 2 with the maximum number of circles "○" is retrieved from transmitter numbers (rows 1, 2, 8, 9, 15, 16, 20, and 21) of the matrix table shown in FIG. 6;

FIG. 13 is a schematic diagram in the case that all receiver numbers 1 to 36 of the matrix table shown in FIG. 4 are out of the coverage in which radio waves cannot be received.

DESCRIPTION OF PREFERRED EMBODIMENT

Next, with reference to the accompanying drawings, an embodiment of the present invention will be described.

Figure 1:
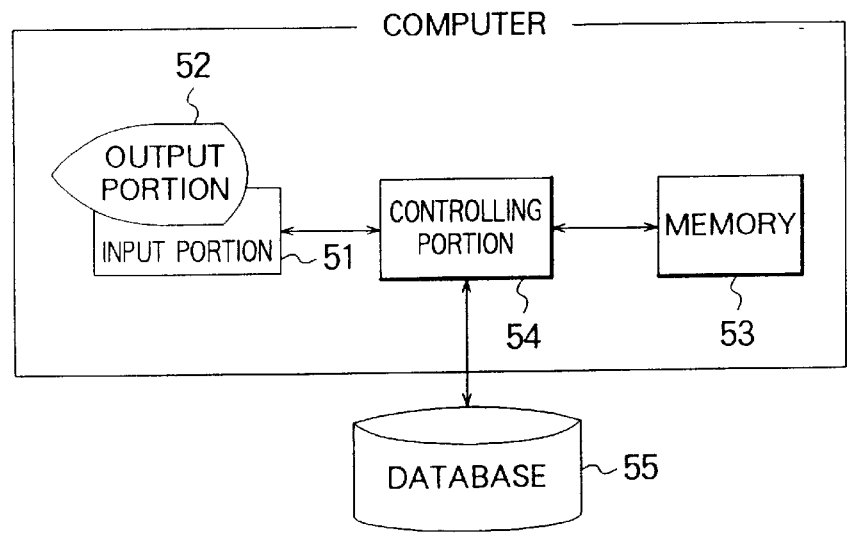
FIG. 1 is a block diagram showing a structure of a base station arranging apparatus according to an embodiment of the present invention.
Figure 2:
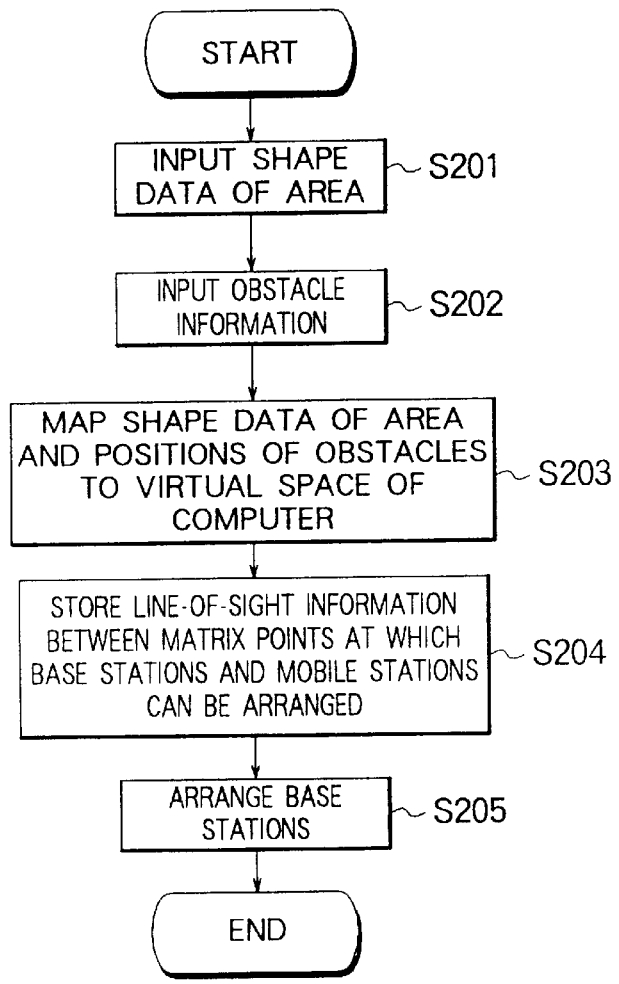
FIG. 2 is a flow chart showing an outlined operation of the base station arranging apparatus, method thereof.
Figure 3:
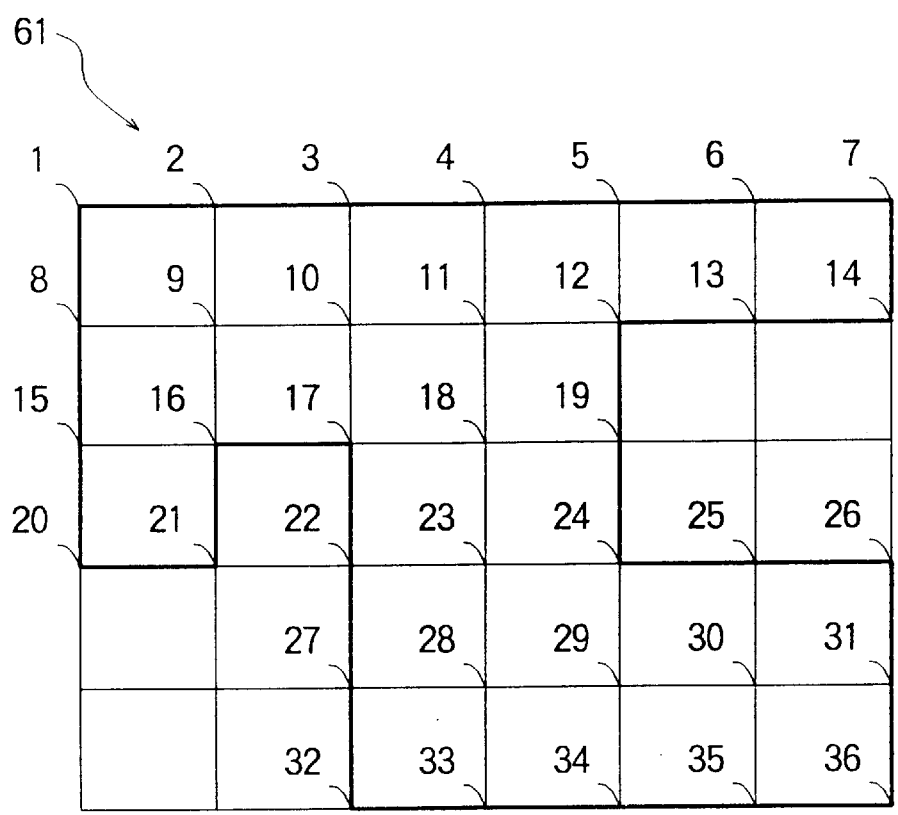
FIG. 3 is a schematic diagram showing a matrix point map of a memory of the base station arranging apparatus.
Figure 4:
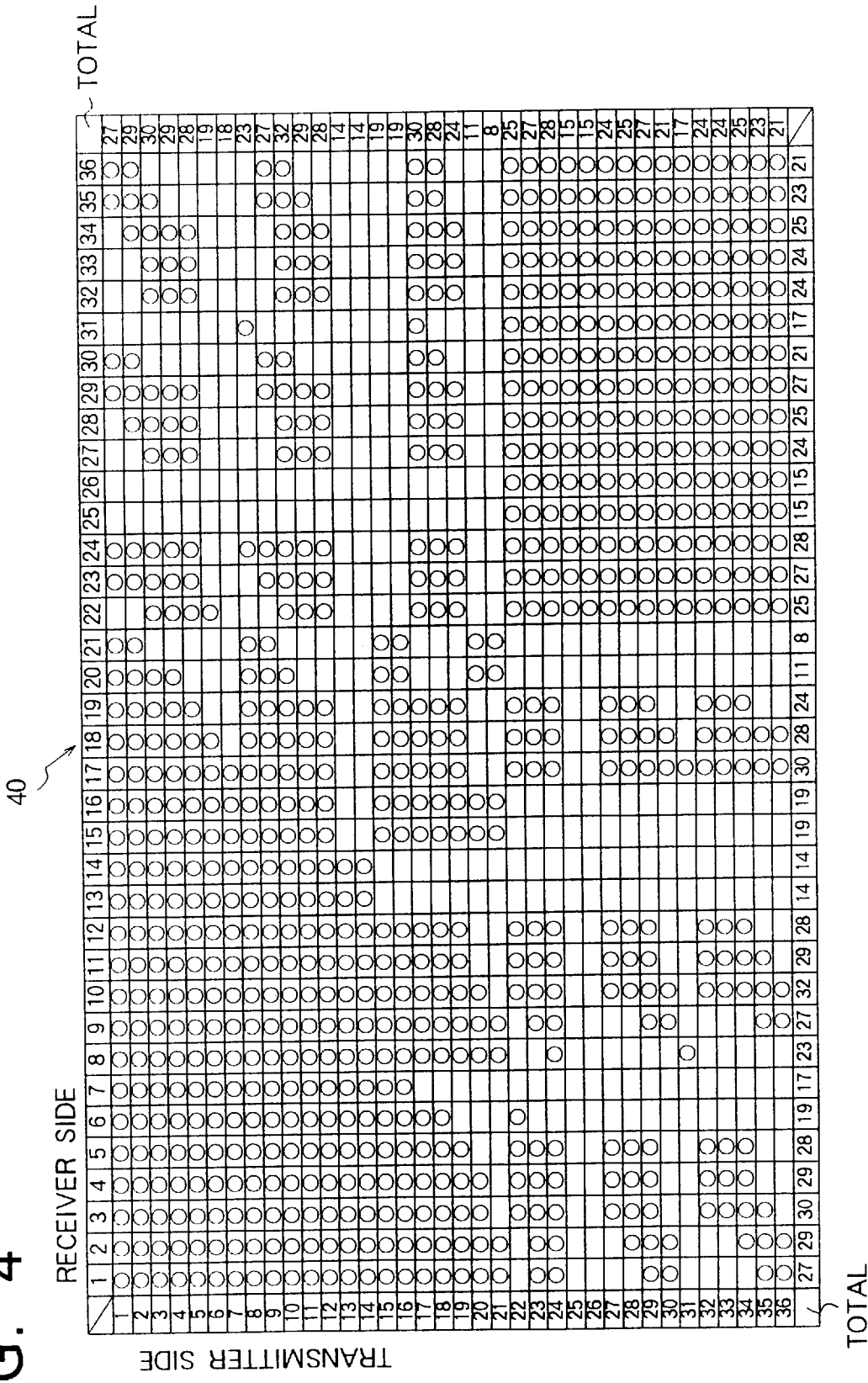
FIG. 4 is a schematic diagram showing a matrix table of a database of the base station arranging apparatus.

FIG. 1 is a schematic diagram showing a structure of a computer as a base station arranging apparatus corresponding to an embodiment of the present invention. FIG. 2 is a flow chart showing an outlined operation of the computer. FIG. 3 is a schematic diagram showing a matrix point map of the memory. FIG. 4 is a schematic diagram showing a matrix table of a database.

In FIG. 1, reference numeral 50 is a computer as a base station arranging apparatus. The computer 50 comprises an input portion 51 (such as a keyboard and an optical disc apparatus), an output portion 52 (such as a monitor), a memory 53, and a controlling portion 54. The memory 53 stores an arrangement chart (matrix point map) with matrix points disposed in a predetermined coordinate system such as a two- or three-dimensional coordinate system so that map information including shape data of the area and obstacle information such as dimensional data and position data of buildings and trees that are input from the input portion 51 are mapped to the lattice point map. The controlling portion 54 controls the input portion 51, the output portion 52, and the memory 53 and performs a base station arranging process and various calculating operations. Reference numeral 55 is a database connected to the controlling portion 54. The database 55 has a matrix table for generating line-of-sight information.

The data (matrix table) in the database 55 can be stored in the memory 53. In other words, both map information and obstacle information can be stored in the memory. In this case, the database 55 shown in FIG. 1 can be omitted.

Next, with reference to FIGS. 2 to 4, a basic operation of the base station arranging apparatus will be described.

In the case of the base station arranging apparatus, shape data (map information) of the area for the radio communication service is input to the computer 50 (at step S201 in FIG. 2). In addition, shape data of obstacles (obstacle information) in the area is input to the computer 50 (at step S202). Thus, the controlling portion 54 maps the obstacle information to the matrix point map (virtual space) formed in the memory 53 (at step S203). The coordinate system is equally sectioned in a matrix shape in X and Y directions so that base stations and mobile stations are always arranged at intersections of the coordinate system.

As shown in FIG. 3, the matrix point map 61 of the memory 53 has 7×7 matrix shaped intersections (matrix points) in for example a rectangular area. With the obstacle information mapped, individual matrix points in the area in which mobile stations and base stations can be arranged (this area is surrounded with sold lines) are assigned numbers 1 to 36. With the matrix point numbers (position information), line-of-sight information between two matrix points of a base station and a mobile station can be obtained.

As shown in FIG. 4, the matrix table 40 of the database 55 is formed so that the vertical axis and horizontal axis are assigned to the transmitter side and the receiver side and matrix point numbers are provided as line-of-sight information columns.

When two stations can be seen through, the line-of-sight information column corresponding to the stations is marked with a circle "○". On the other hand, when two stations cannot be seen through, the line-of-sight information column corresponding thereto is kept blank. For each column and each row of the matrix point map, this operation is repeated. For each column and each row, the line-of-sight information is calculated (at step S204). With the calculated line-of-sight information, the controlling portion 54 executes the arranging operation for base stations (at step S205).

Figure 5:
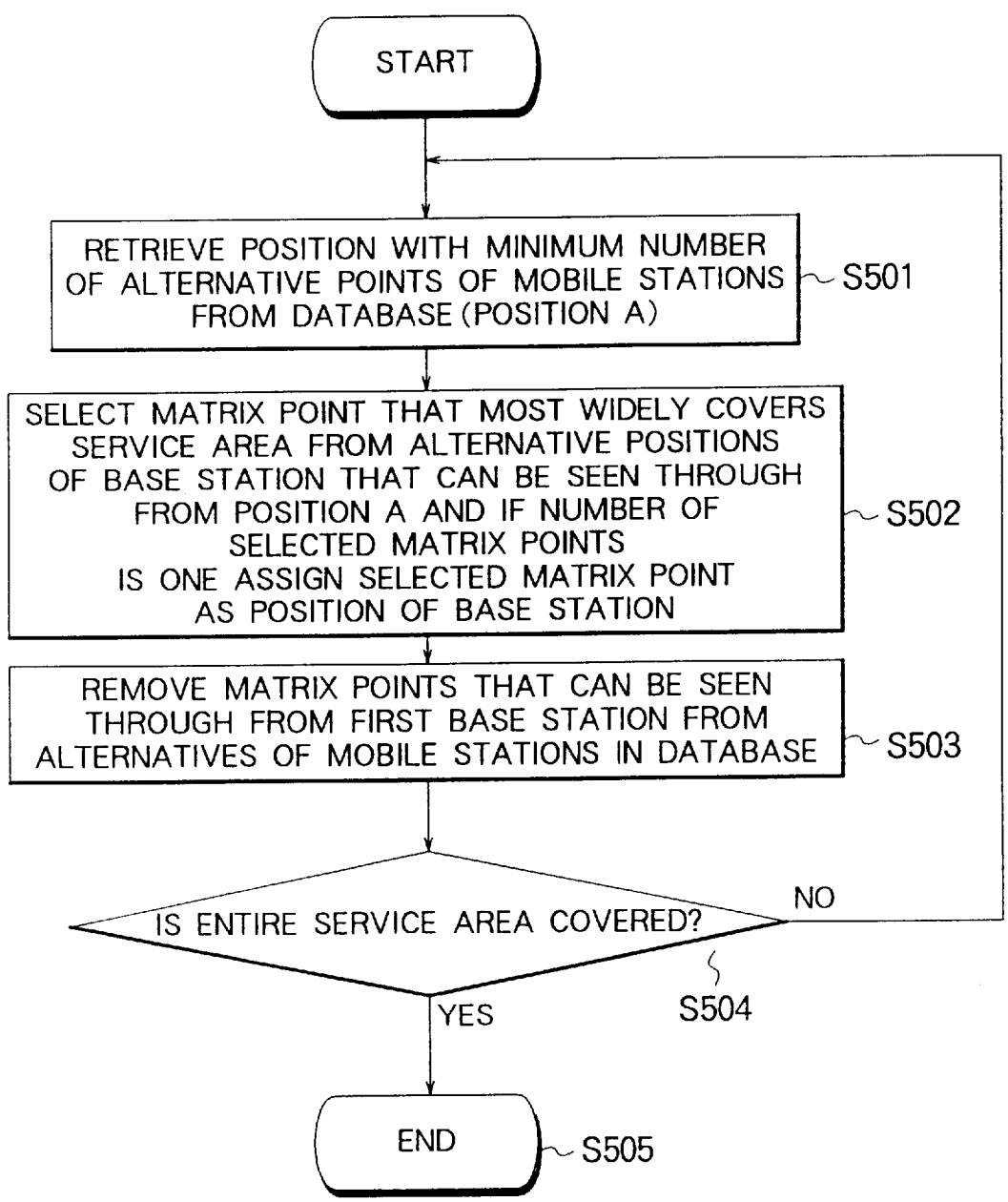
FIG. 5 is a flow chart showing a base station arranging operation of a controlling portion of the base station arranging apparatus.
Figure 8:
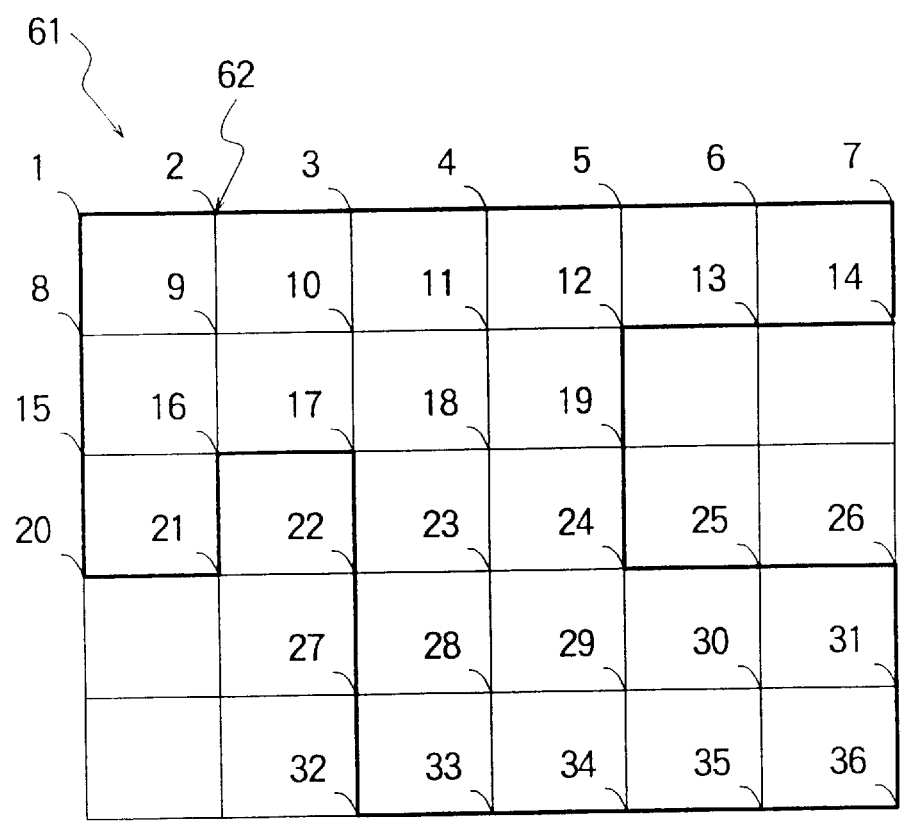
FIG. 8 is a schematic diagram showing a matrix point map with a mark of a first base station's position.

Next, with reference to a flow chart shown in FIG. 5 and schematic diagrams shown in FIGS. 6 to 13, the base station arranging operation of the controlling portion 54 will be described. FIGS. 6, 7, 9, 10, 11, and 13 show retrieved states of line-of-sight information on the matrix table 40 at each operation step. FIG. 8 shows a matrix point map with a position of first station. FIG. 12 shows a matrix point map with a position of second base station.

The positions of base stations are retrieved from the matrix table 40 (shown in FIG. 4) of the database 55 by the controlling portion 54.

In this case, the controlling portion 54 calculates the total number of alternative points at which a base station can be arranged for each of 36 matrix points of the matrix table 40. The position of the mobile station with the minimum number of alternative points is selected (at step S501 in FIG. 5).

Figure 6:
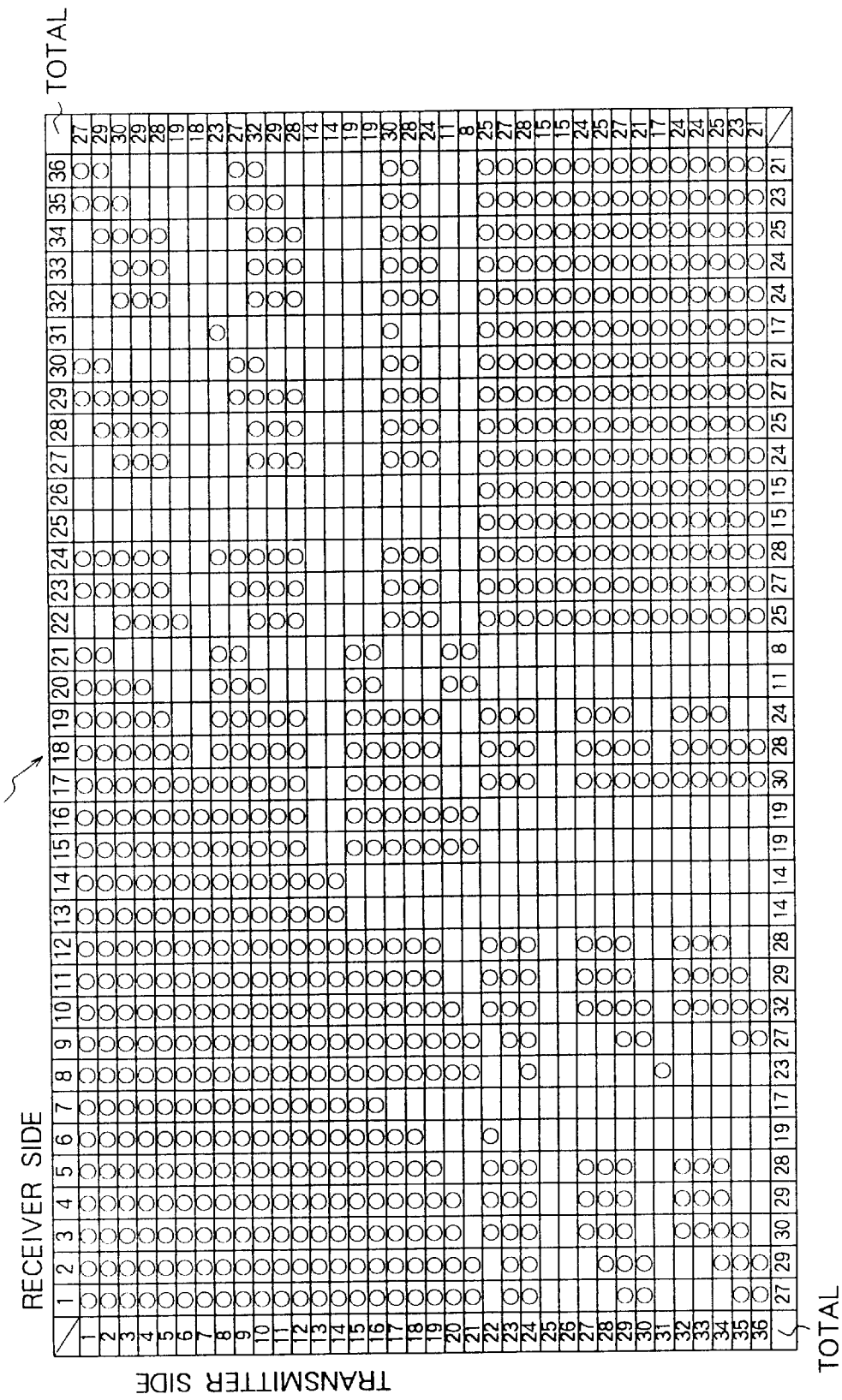
FIG. 6 is a schematic diagram in the case that a receiver number 21 with the minimum number of circles "∘" is retrieved from receiver numbers (columns 1 to 36) of the matrix table shown in FIG. 4 is retrieved.

As shown in FIG. 6, the receiver number (column number) 21 with the minimum number of circles "○" is selected from the receiver numbers (column numbers) 1 to 36 of the matrix table 40. In this case, since the total number of circles of the receiver number (row number) 21 is eight (namely, that is the minimum in the other receiver numbers), the matrix point corresponding to the receiver number (row number 21) is selected.

Thereafter, the controlling portion 54 selects a matrix point that can most widely cover the area from eight alternative positions (transmitter numbers (row numbers) 1, 2, 8, 9, 15, 16, 20, and 21) of a base station (transmitter side) that can communicate with the receiver number (column number) 21 (that is the position of a mobile station) and assigns the selected matrix point as a first base station arranging position (at step S502).

Figure 7:
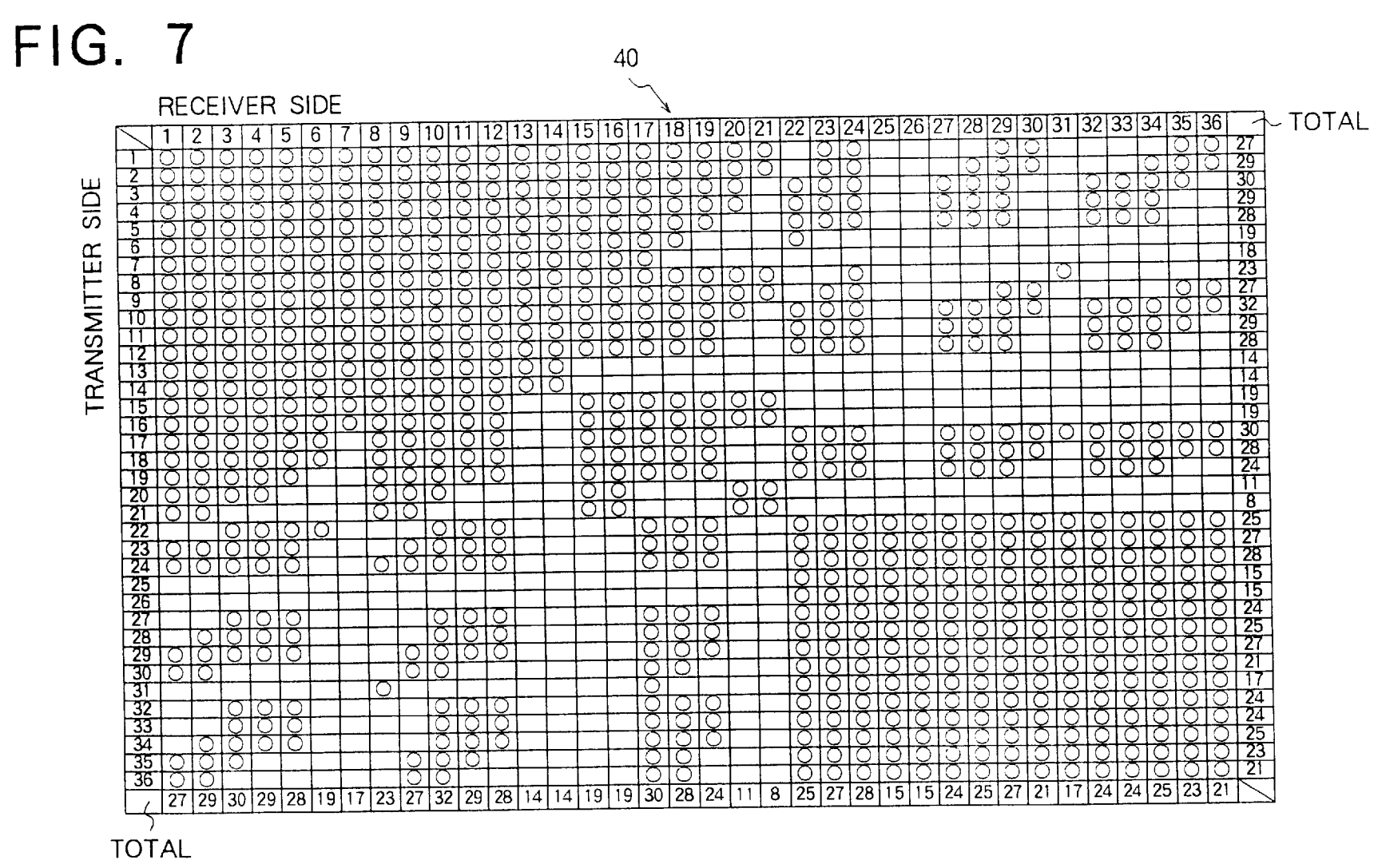

As shown in FIG. 7, the total number of circles "○" of the transmitter number (row number) 2 is 29, it is the maximum number in the transmitter number (row numbers) 1, 2, 8, 9, 15, 16, 20, and 21 of the matrix table 40. Thus, in this case, the transmitter number (row number) 2 is selected.

The controlling portion 54 assigns the matrix point of transmitter number (row number) 2 as the position at which the first base station is arranged and places a position mark 62 of first base station with a cross mark "x" at the matrix point of transmitter number (row number) 2 of the matrix point map 61 as shown in FIG. 8.

Thereafter, the controlling portion 54 generates line-of-sight information with the matrix point (transmitter number (row number) 2) assigned the position mark 62 of the first base station and removes the range thereof from the entire area (at step S503).

Figure 9:
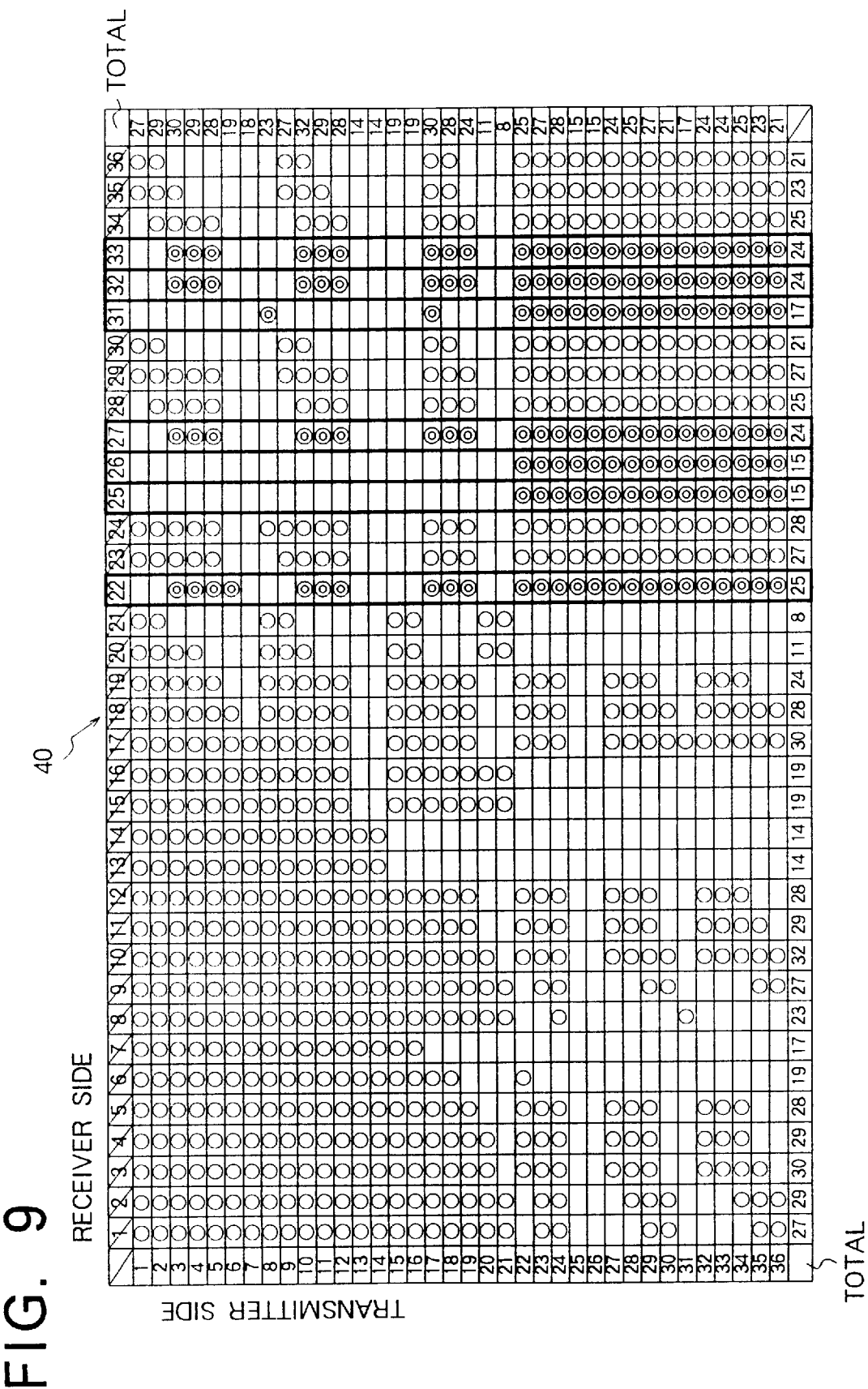
FIG. 9 is a schematic diagram in the case that only receiver numbers 22, 25, 26, 27, 31, 32, and 33 are left in the matrix table shown in FIG. 4 and the circles "○" thereof are substituted with double-circles "⊙"

In other words, as shown in FIG. 9, only the receiver numbers (column numbers) 22, 25, 26, 27, 31, 32, and 33 of the matrix table 40 are left. In addition, the circles "○" in these columns are substituted with double-circles "◎".

Thereafter, for the resultant matrix points (the receiver points "◎" to which no radio wave reaches from the first base station), alternative positions of second and later base stations are selected.

In other words, the controlling portion 54 finds positions so that the number of base stations becomes the minimum.

Figure 10:
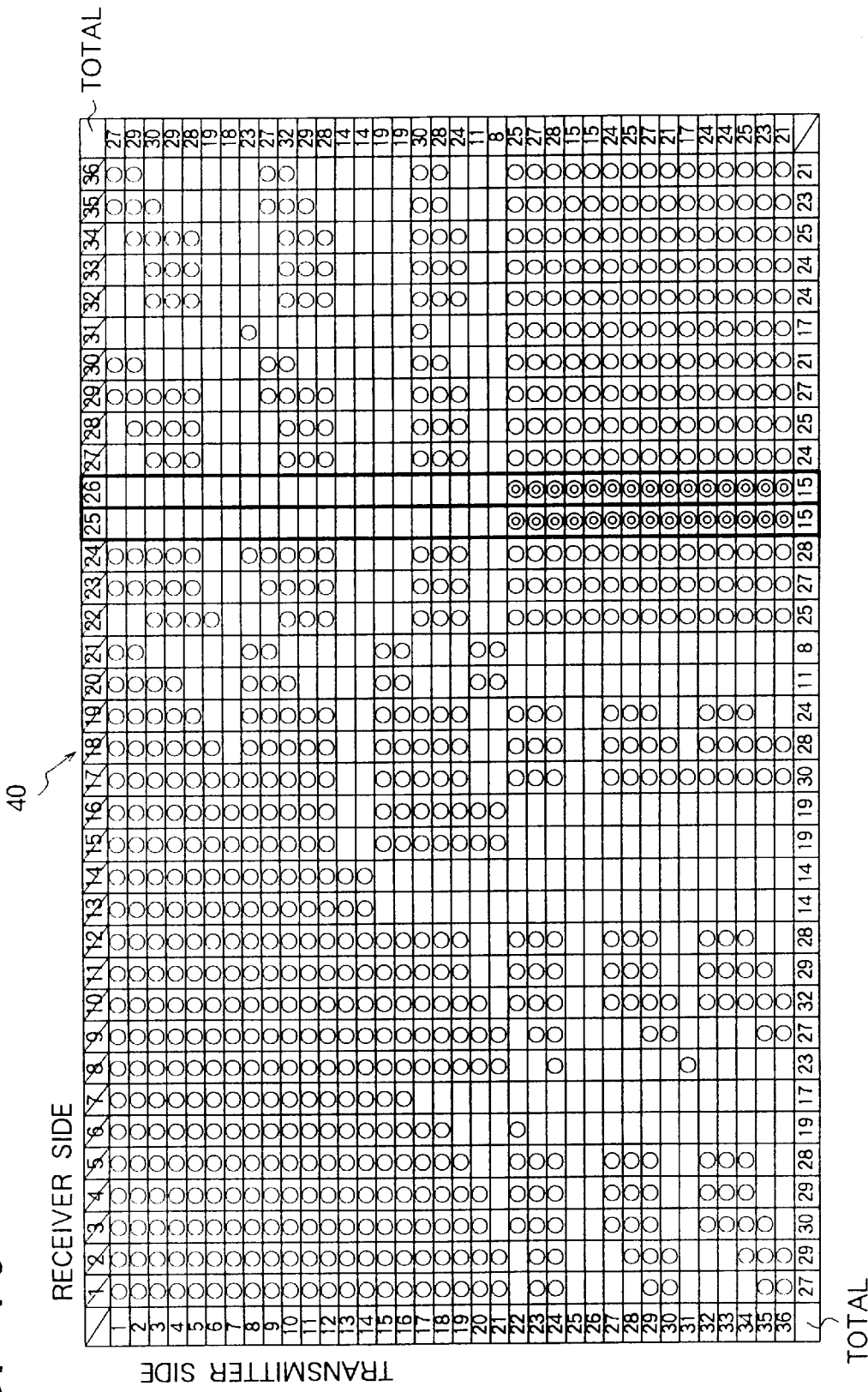
FIG. 10 is a schematic diagram in the case that receiver numbers 25 and 26 with the minimum number of double circles "⊙" are retrieved from the matrix table shown in FIG. 9.

In this case, the controlling portion 54 selects a receiver number (column number) so that the total number of double-circles "◎" becomes the minimum from the receiver numbers (column numbers) 22, 25, 26, 27, 31, 32, and 33. In other words, as shown in FIG. 10, since the total number of double-circles "◎" of each of the receiver numbers (column numbers) 25 and 26 is fifteen that is the minimum in the other alternatives on the matrix table, the receiver numbers (column numbers) 25 and 26 are selected.

Thereafter, the controlling portion 54 selects a matrix point that can most widely cover the area from fifteen alternative points (transmitter numbers (row numbers) 22 to 36) which can communicate with the receiver numbers (column numbers) 25 and 26 (the positions of mobile stations) and assigns the selected matrix point as the position at which a second base station is arranged. At this point, the alternative points are selected so that they cover the area of the first base station.

Figure 11:
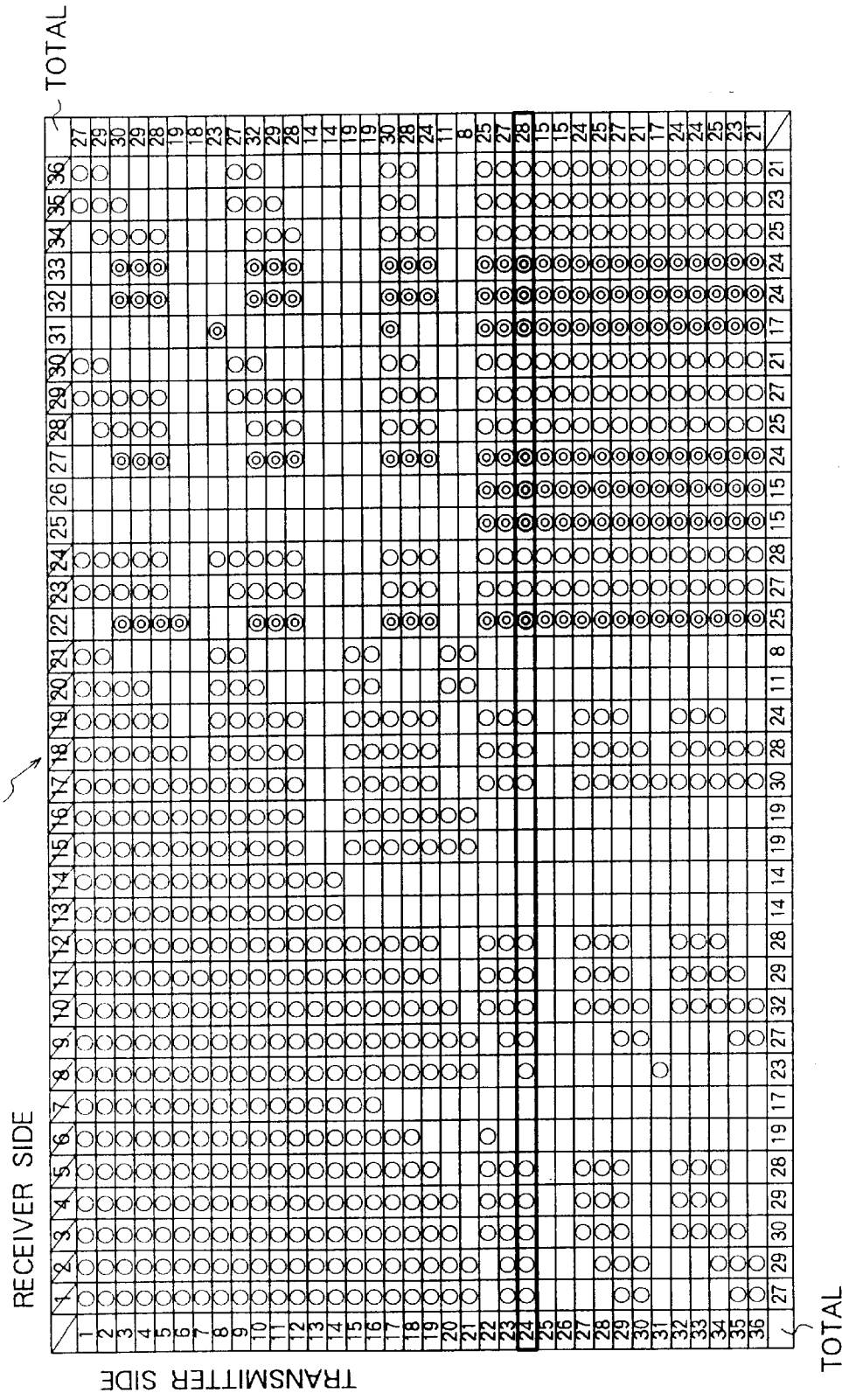
FIG. 11 is a schematic diagram in the case that a transmitter number 24 with he maximum numbers of circles "○" and double circles "⊙" is retrieved from the receiver numbers 25 and 26 of the matrix table shown in FIG. 10.
Figure 12:
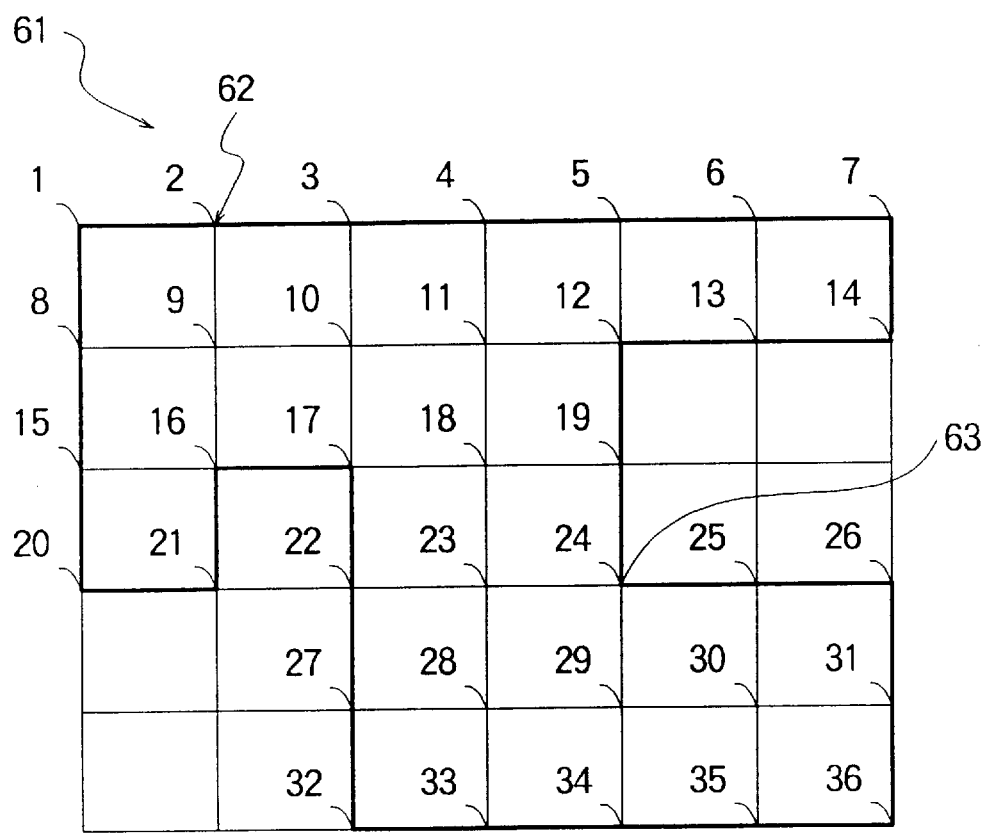
FIG. 12 is a schematic diagram showing a matrix point map with a position mark of a second base station.

As shown in FIG. 11, a matrix point with the maximum number of double-circles "◎" is selected from the transmitter numbers (row numbers) 22 to 26 of the matrix table as shown in FIG. 11. In this case, the number of double-circles "◎" of each of the transmitter numbers (row numbers) 22 to 36 is seven. Next, a matrix point with the maximum number of circles regardless of single-circles "○" and double-circles "◎" is selected from the transmitter numbers (row numbers) 22 to 36. Since the transmitter number (row number) 24 has a total of 28 circles regardless of single-circles and double-circles, it is the maximum in the transmitter numbers (row numbers) 22 to 36 of the matrix table 40. Thus, the transmitter number (row number) 24 is selected as an alternative point of the second base station. The controlling portion 54 assigns the matrix point of the transmitter number (row number) 24 as the position at which the second base station is arranged. As shown in FIG. 12, a position mark 63 of the base station with a cross mark "x" is placed at the matrix point of transmitter number (row number) 24 of the matrix point map 61.

When there are a plurality of matrix points at which the widest service area can be provided, a matrix point that can most widely cover the area is selected from them considering the areas of the other base station that has been arranged.

In addition, the controlling portion 54 generates line-of-sight information with the matrix points (transmitter number (row numbers) 2 and 24) denoted by the position marks 62 and 63 and removes the range from the entire area.

Figure 13:
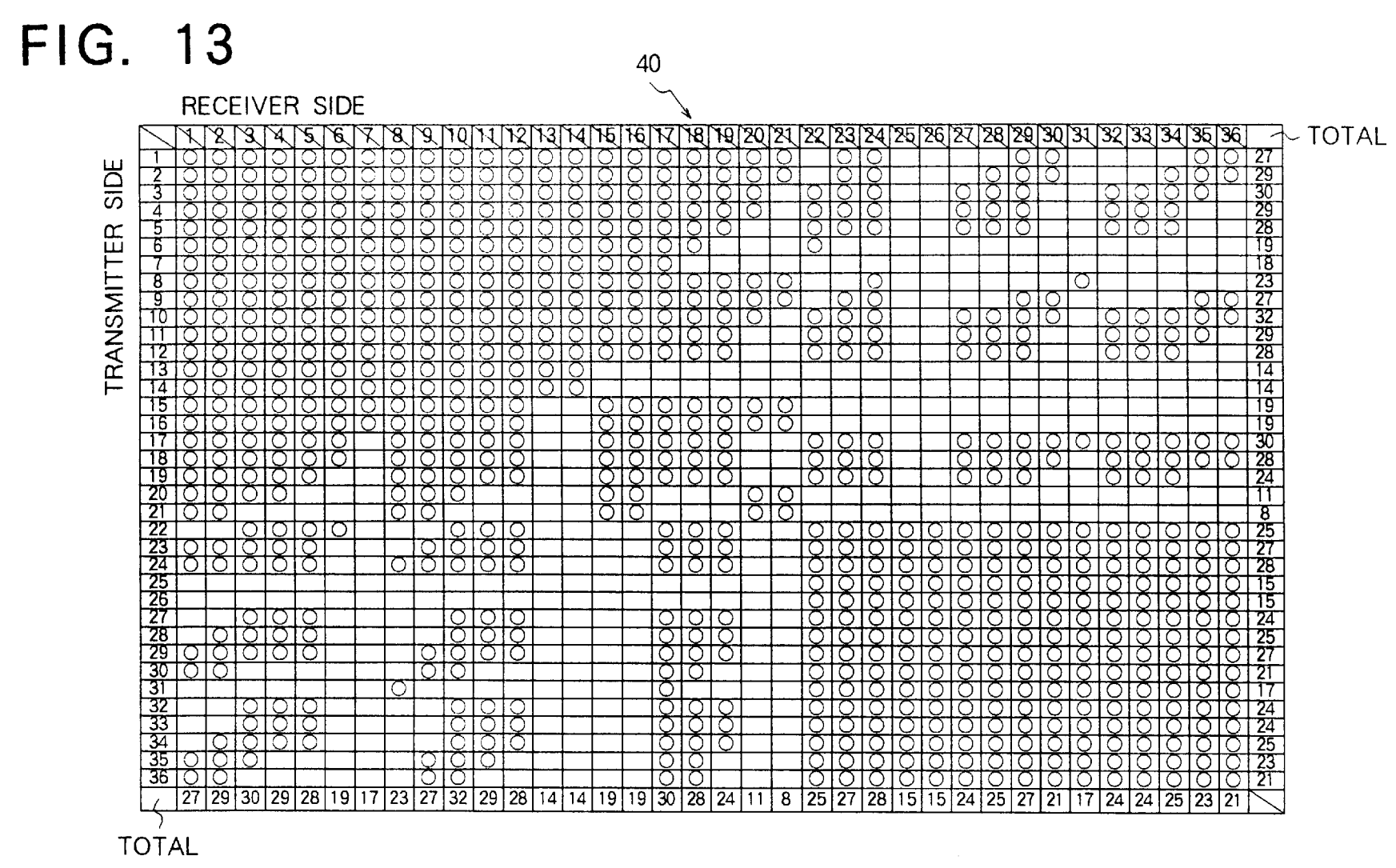

In this case, as shown in FIG. 13, since all the receiver numbers (column numbers) are hatched, all matrix points are removed from the range in which radio waves do not reach, the entire area is covered by the two base stations. Thus, the controlling portion 54 completes the base station arranging process (at steps S504 and S505).

Thus, in the base station arranging apparatus according to the embodiment of the present invention, since the controlling portion 54 generates the matrix table 40 in the database 55 corresponding to the map information and building information stored in the memory 53 so that line-of-sight information between two points of a receiver side and a transmitter side is stored in each matrix point of the matrix table 40. With reference to the matrix table 40, the controlling portion 54 finds a matrix point number with the minimum number of points that can be seen through from the receiver numbers. Next, the controlling portion 54 selects a matrix point number with the maximum number of points that can be seen through from the found matrix point numbers and assigns the selected matrix point number as a first base station position. In such a manner, the controlling portion 54 successively arranges base stations. Thus, with the minimum number of base stations, the entire area can be covered.

In other words, the positions of mobile stations whose service areas are difficult to determine and alternative positions of base stations are assigned as intersections of a matrix of map information and obstacle information. Line-of-sight information is generated for each intersection of the matrix. A first base station is arranged at a position at which it has the widest service area. Corresponding to the first base station, other base stations are successively arranged. Thus, a desired service area can be covered with the minimum number of base stations.

Consequently, base stations can be effectively arranged regardless of whether a building is under construction in the area or it has been just designed, not constructed without necessity of the experience of the radio communication engineer.

It should be noted that the present invention is not limited to the above-described embodiment.

In the above-described embodiment, the controlling portion of the computer arranges base stations. However, the function of the controlling portion can be accomplished by software that is a program stored on a storing medium such as a floppy disk, a magnetic optical disc, or a digital video disc. A computer reads the program stored on the storing medium and executes a predetermined process so as to accomplish the function of the above-described embodiment.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A base station arranging apparatus, comprising:

alternative point assigning means for assigning alternative points of a mobile station and a base station in a space formed of shape data and obstacle data;

calculating means for calculating the number of alternative points on receiver side with which each of alternative points on transmitter side that can become alternatives of a base station can communicate; and base station assignment point determining means for determining an alternative point on the transmitter side that can communicate with the maximum number of alternative points on the receiver side in the alternative points calculated by said calculating means as an arrangement point of the base station.

2. A base station arranging apparatus, comprising:

input means for inputting shape data of a predetermined space and obstacle data that adversely affects radio communication in the space;

station alternative position assigning means for assigning a plurality of positions of which a mobile station or a base station can be arranged in the predetermined space formed corresponding to the shape data and obstacle data in the predetermined space being input by said input means;

two-point communication determining means for determining whether or not radio communication can be made between any two points of the plurality of alternative points assigned by said station alternative position assigning means;

transmitter side maximum point selecting means for selecting an alternative point on the transmitter side that can communicate with the maximum number of alternative points on the receiver side from the plurality of alternative points assigned by said station alternative position assigning means corresponding to the determined result of said two-point communication determining means; and determining means for determining the alternative point on the transmitter side selected by said transmitter side maximum point selecting means as an arrangement point of the base station.

3. A base station arranging apparatus, comprising:

alternative point assigning means for assigning alternative points of a mobile station and a base station in a space formed of shaped data and obstacle data;

first calculating means for calculating the number of alternative points on the receiver side with which each of alternative points on the transmitter side of a base station can communicate;

first base station arrangement point selecting means for selecting an alternative point on the transmitter side that can communicate with the maximum number of alternative points on the receiver side calculated by said first calculating means as an arrangement point of a first base station;

second calculating means for calculating the number of alternative points on the transmitter side of which the first base station can communicate with alternative points on the receiver side in an area that the first base station cannot communicate with the alternative points on the receiver side when the first base station is arranged at the arrangement point selected by said first base station arrangement selecting means;

first receiver side alternative point selecting means for selecting an alternative point on the receiver side that can communicate with the minimum number of alternative points on the transmitter side selected by said second calculating means; and base station arrangement point determining means for determining an alternative point on the transmitter side that can communicate with the alternative point on the receiver side selected by said first receiver side alternative point selecting means and that can communicate with the maximum number of alternative points on the receiver side in an area of which the first base station cannot communicate therewith.

4. A base station arranging apparatus, comprising:

input means for inputting shape data of a predetermined space and obstacle data that adversely affects radio communication in the space;

station alternative position assigning means for assigning a plurality of positions of which a mobile station or a base station can be arranged in the space formed of the shape data and the obstacle data being input by said input means as alternative points;

two-point communication determining means for determining whether or not radio communication can be made between any two points of the plurality of alternative points assigned by said station alternative position assigning means;

first transmitter side maximum point selecting means for selecting an alternative point on the transmitter side that can communicate with the maximum number of alternative points on the receiver side from the plurality of alternative points assigned by said station alternative position assigning means corresponding to the determined result of said two-point communication determining means;

receiver side minimum point selecting means for selecting an alternative point on the receiver side that communicates with the minimum number of alternative points on the receiver side from alternative points on the receiver side with which the alternative point on the transmitter side selected by said first transmitter side maximum point selecting means does not communicate corresponding to the determined result of said two-point communication determining means;

second transmitter side maximum point selecting means for selecting an alternative point on the transmitter side (second alternative point on the transmitter side) that can communicate with the alternative point on the receiver side selected by said receiver side minimum point selecting means and which the maximum number of the first alternative points on the transmitter side do not communicate corresponding to the determined result of said two-point communication determining means; and base station arrangement point determining means for determining the first alternative point on the transmitter side selected by said first transmitter side maximum point selecting means as the arrangement point of a first base station and determining the second alternative point on the transmitter side selected by said second transmitter side maximum point selecting means as the arrangement point of a second base station.

5. A base station arranging apparatus, comprising:

input means for inputting shape data of a predetermined space and obstacle data that adversely affects radio communication in the space;

station alternative area forming means for forming an area in which a mobile station or a base station can be arranged in the space corresponding to the shape data of the space and the obstacle data being input by said input means;

station alternative position assigning means for assigning a plurality of positions in which a mobile station or a base station can be arranged in the area formed by said station alternative area forming means;

two-point communication determining means for determining whether or not communication can be made between any two points of the plurality of alternative points assigned by said station alternative position assigning means;

total calculating means for calculating the total number of alternative points on the transmitter side and receiver side determined by said two-point communication determining means;

receiver side minimum point selecting means for selecting an alternative point on the receiver side that can communicate with the minimum number of alternative points on the transmitter side from a plurality of alternative points on the receiver side corresponding to the calculated result of said total calculating means;

transmitter side maximum point selecting means for selecting an alternative point on the transmitter side that can communicate with the maximum number of alternative points on the receiver side from a plurality of alternative points on the transmitter side that can communicate with the alternative point on the receiver side selected by said minimum point selecting means; and base station arrangement point determining means for determining an alternative point selected by said transmitter side maximum point selecting means as the arrangement point of a base station.

6. The base station arranging apparatus as set forth in claim 3 or 4, wherein if there are a plurality of alternative points that can become the arrangement point of the second base station, said base station assignment point determining means determines an alternative point on the transmitter side that can communicate with the maximum number of alternative points in the space as the arrangement point of the second base station.

7. The base station arranging apparatus as set forth in claim 1 or 3, wherein the validity of radio communication between any two alternative points is determined whether or not an alternative point on the receiver side can be seen from an alternative point on the transmitter side.

8. The base station arranging apparatus as set forth in claim 5, wherein said total calculating means tabulates alternative points that can communicate as a transmitter side and a receiver side and calculates points in a matrix shape.

9. The base station arranging apparatus as set forth in claim 2, 4, or 5, wherein said two-point communication determining means determines whether or not communication can be made between any two points of the plurality of alternative points assigned by said station alternative position assigning means by determining whether or not the point on the receiver side can be seen from the point on the transmitter side.

10. A base station arranging method, comprising the steps of:
(a) inputting shape data of a predetermined space and obstacle data that adversely affects radio communication in the space to a controlling portion of a computer;
(b) forming an area in which a mobile station or a base station can be arranged in the space in a memory corresponding the shape data of the predetermined space and the obstacle data being input, the step (b) being performed by the controlling portion;
(c) assigning a plurality of positions of which a mobile station or a base station can be arranged in an area formed in said memory as alternative points;
(d) determining whether or not radio communication can be made between any two points of the plurality of alternative points;
(e) calculating the total number of alternative points on the transmitter side and receiver side that can be communicated as the determined result of the step (d);
(f) selecting an alternative point on the transmitter side that can communicate with the minimum number of alternative points on the receiver side from the plurality of alternative points on the transmitter side corresponding to the calculated results of the step (e);
(g) selecting an alternative point on the transmitter side that can communicate with the maximum number of alternative points on the receiver side from the plurality of alternative points on the transmitter side the can communicate with the alternative point on the receiver side selected by the step (f); and
(h) determining the alternative point selected by the step (f) as the arrangement point of a base station.

11. The base station arranging method as set forth in claim 10, further comprising the step of:

after the arrangement point of the base station is determined, removing a range of which radio communication can be made from the determined arrangement point of the base station from the memory and successively arranging base stations until there are no remaining area.

12. A storing medium for storing a program that causes a computer to determine the arrangement point of a base station that performs radio communication, wherein the program causes the computer to form an area in which a mobile station or a base station can be arranged corresponding to shape data in a predetermined space and obstacle data, assign a plurality of positions in which a mobile station or a base station can be arranged in the area as alternative points, determine whether or not radio communication can be made between any two points of the plurality of alternative points being assigned, calculate the total number of alternative points on each of the transmitter side and receiver side that can be communicated as the determined result, select an alternative point on the receiver side that can communicate with the minimum number of alternative points on the transmitter side from the alternative points on the receiver side, select an alternative point on the transmitter side that can communicate with the maximum number of alternative points on the receiver side from the plurality of alternative points on the transmitter side that can communicate with the selected alternative point on the receiver side, and determine the selected alternative point as the arrangement point of a base station.

13. A storing medium for storing a program that causes a computer to determine the arrangement point of a base station that performs radio communication, the program causing the computer to form an area in which a mobile station or a base station can be arranged in a predetermined space corresponding to shape data of the predetermined space and obstacle data, assign an alternative point in which a mobile station or a base station can be arranged in the area, calculate the number of alternative points on the receiver side that can communicate with each of alternative points on the transmitter side as alternative arrangement points of a base station, select an alternative point on the transmitter side that can communicate with the maximum number of alternative points on the receiver side as the arrangement point of a first base station, calculate the number of alternative points on the transmitter side that can communicate with alternative points on the receiver side in an area of which radio communication cannot be made from the first base station at the arrangement point, select an alternative point on the receiver side that can communicate with the minimum number of alternative points on the transmitter side from the selected alternative points on the transmitter side, and determine an alternative point on the transmitter side that can communicate with the maximum number of alternative points on the receiver side in an area in which communication cannot be made from the first base station as the arrangement point of a second base station.

14. The storing medium as set forth in claim 13,
wherein if there are a plurality of alternative points as a base station, an alternative point on the transmitter side that can communicate with the maximum number of alternative points on the receiver side in the space is determined as the arrangement point of a base station.

* * * * *